April 25, 1967 J. G. HIRSCHBERG 3,316,412
SINGLE FIELD POLARIZING SPECTROPHOTOMETER FOR MEASURING
MASS MOTION IN A PLASMA
Filed June 9, 1964
2 Sheets-Sheet 1

INVENTOR.
JOSEPH G. HIRSCHBERG
BY

United States Patent Office

3,316,412
Patented Apr. 25, 1967

3,316,412
SINGLE FIELD POLARIZING SPECTROPHOTOMETER FOR MEASURING MASS MOTION IN A PLASMA
Joseph G. Hirschberg, Princeton, N.J., assignor to the United States of America as represented by the United States Atomic Energy Commission
Filed June 9, 1964, Ser. No. 373,895
1 Claim. (Cl. 250—226)

ABSTRACT OF THE DISCLOSURE

Apparatus for measuring mass motion in a plasma by measuring the wavelength shift in an unpolarized beam of light directed across the plasma in a narrow range of wavelengths, wherein a monochromator transmits the light beam, a first refracting prism splits the beam into equal perpendicularly polarized rays, a refracting prism separates the polarized rays, and photosensitive means produces electrical signals corresponding to the wavelength shift in the beam in passing through the plasma.

---

Figure 1:
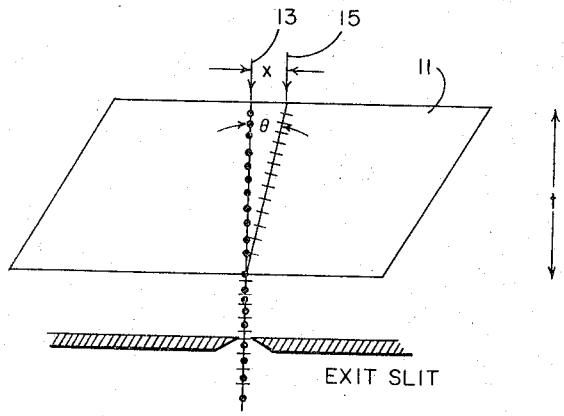

This invention relates to mass motion measurement and more particularly to a method and apparatus for measuring mass motion in a hot gas or plasma.

In plasma physics it is often desirable to have a simple device to measure the mass motion of a plasma such as the stellarator plasma, which emits a line spectrum. If $w_s$ is the component of velocity of the emitter in the line of sight, from relativity we have the familiar formula for the frequency of the light received:

$$v' = v\left(1 \pm \frac{w_s}{c} + \frac{1}{2}\frac{w_s^2}{c^2} \pm \frac{1}{2}\frac{w_s^3}{c^3} + \cdots\right)$$

Only the first term $w_s/c$ is ordinarily significant, and:

$$\frac{\Delta \mu}{\mu} = \pm \frac{w_s}{c} \text{ or } \frac{\Delta \lambda}{\lambda} = \frac{w_s}{c}$$

Thus to obtain $w_s$, a shift in wavelength, often very small, is to be measured.

The measurement of such a wavelength shift can in general only be performed if the spectrum contains sharp lines. Let us consider such a line measured by a perfect monochromate with shape given by $S(\lambda)$. A central wavelength, $\lambda_o$, exists such that $$\int_0^{\lambda_o} S(\lambda)d\lambda = \int_{\lambda_o}^{\infty} S(\lambda)d\lambda$$

The problem, therefore, is to measure small shifts $\Delta\lambda$ from $\lambda_o$.

Various proposals have been made and used to accomplish such measurements including the use of spectrometers having light pipes, rotating quartz plates and rapidly sweeping Kerr effect prisms. While these systems have been useful and can accomplish the desired determinations, they do require the manufacture and assembly of costly or undependable apparatus. Moreover, it has been desirable to provide a system that does not require delicate alignment or complicated electronic gear and provides measurement of a band of wavelengths down to 2000 A.

It is an object of this invention, therefore, to provide spectrographic means that is simple in construction and operation for measuring the mass motions in plasma.

It is another object of this invention to provide simple refraction means for measuring small shifts in wave length;

It is another object of this invention to provide a single field polachromator for measuring small Doppler shifts in wave length;

It is another object of this invention to provide a very fast rise time, greater than one megacycle equivalent;

It is another object of this invention to provide light for two channels from exactly the same part of the plasma;

It is another object of this invention to provide a free choice of channel adjustment and separation from a zero separation;

It is another object of this invention to provide conservation of light to a maximum degree;

It is another object of this invention to allow operation at the full resolving power of a grating;

It is still another object of this invention to operate over a wide band of wave lengths down to an ultraviolet wavelength of 2000 A.

In accordance with this invention, there is provided a method and apparatus for measuring the plastic mass motion in the stellarators at Princeton University which move high and low density plasmas up to maximum velocities and temperatures. The method and construction involved in this invention utilizes standard and well known techniques and apparatus and is highly flexible for a wide range of applications, energies, types of particles, and particle velocities, temperatures and densities. More particularly, this invention contemplates refraction means for measuring the wave length shift in a pass band beam of light having a narrow range of wave lengths, comprising a system of prisms for separating the pass band beam into two polarized beams having a wave length separation for conducting them into separate photosensitive means for producing electrical outputs corresponding to the wave length shift in the pass-band. With the proper selection of refraction means and separation as described in more detail hereinafter, the desired measurements are provided.

The above and further objects and novel features of this invention will appear more fully from the following description when the same is read in connection with the accompanying drawings. It is to be expressly understood, however, that the drawings are not intended as a definition of the invention but are for the purpose of illustration only.

Figure 2:
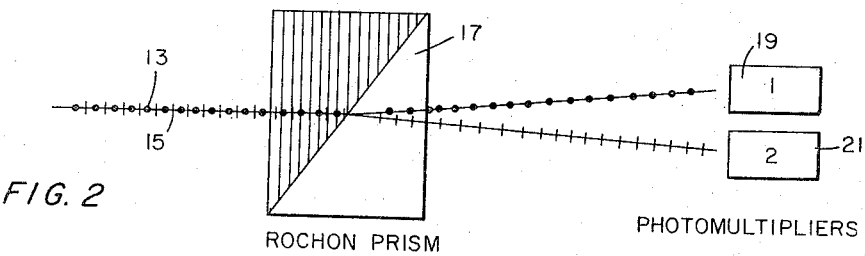
Figure 3:
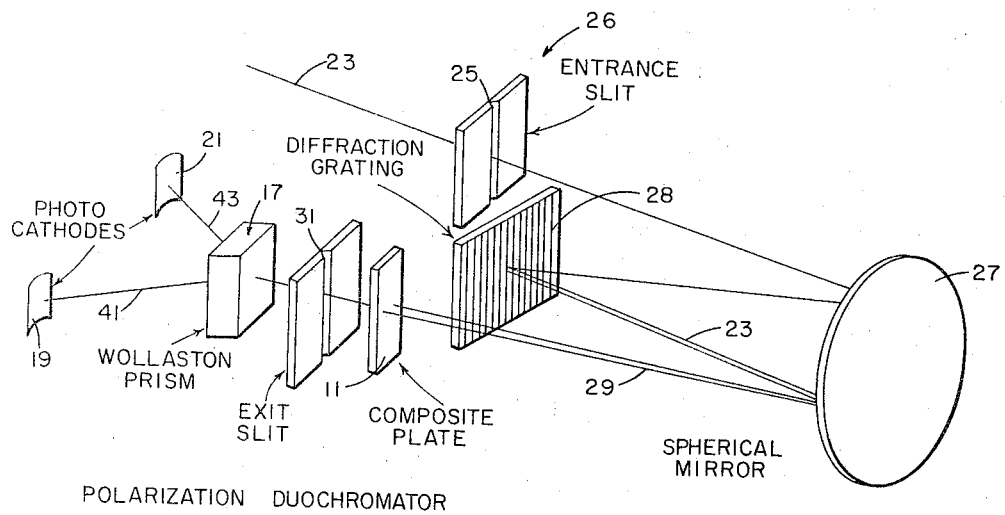
Figure 4:
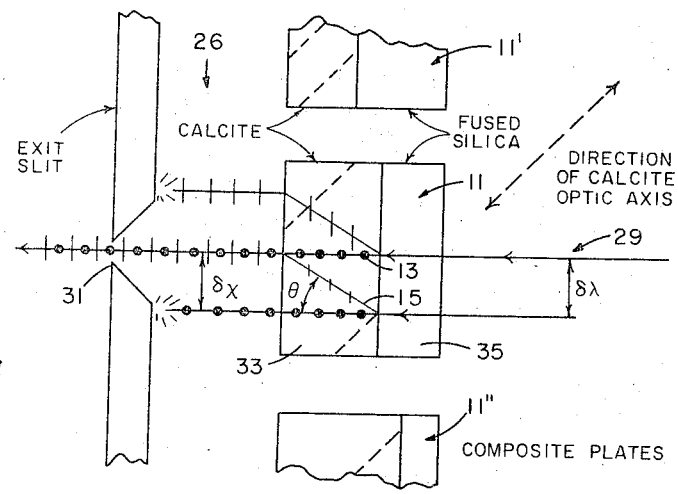
Figure 5:
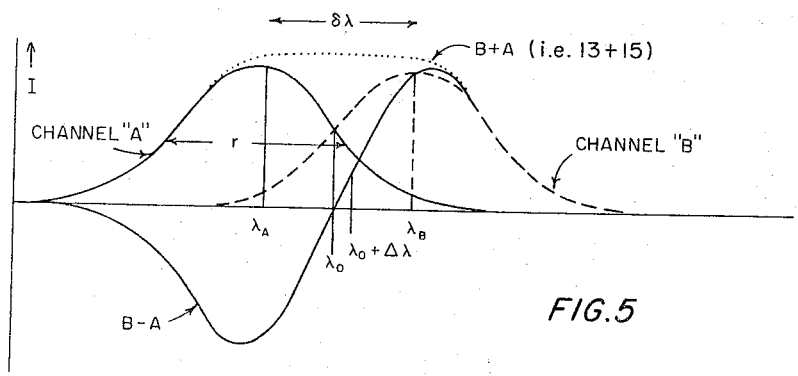
Figure 6:
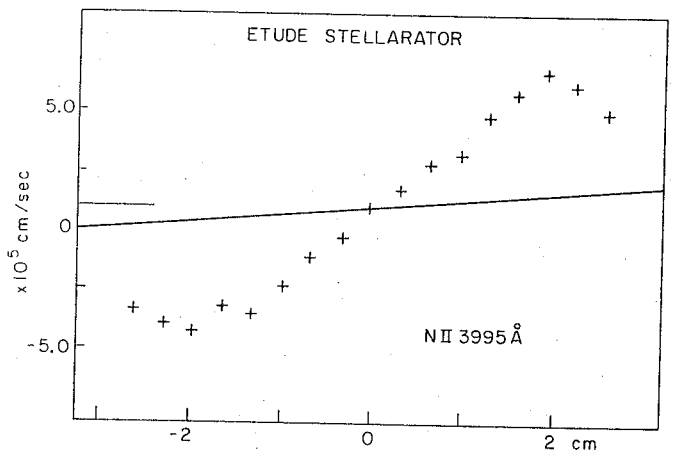

In the figures, where like parts are marked alike:
FIG. 1 is a schematic diagram of a beam polarizer;
FIG. 2 is a partial cross-section of the beam separator for the polarizer of FIG. 1;
FIG. 3 is a partial three-dimensional view of apparatus of FIG. 1 in the system of this invention;
FIG. 4 is a partial cross-sectional schematic of the composite plate of FIG. 3;
FIG. 5 is a graphic illustration of wave length separation of the system of FIG. 3;
FIG. 6 is a graphic illustration of a measurement of a stellarator plasma in accordance with this invention.

The particles present in the gas or plasma in the Etude stellarator at Princeton University often have high velocities, which must be determined. Since the plasma energy, temperature and density are sufficient to produce a line spectrum, and these particles are moving with different velocities, the Doppler effect somewhat broadens this line spectrum over a range of wave lengths which corresponds with the velocity of the particles.

The wave length shift $\Delta\lambda$ in the spectral lines emitted is given by the expression $\Delta\lambda = v/C$ where $\lambda$ is the wave length, $v$ is the velocity of the particles (or a particle) and $C$ is the velocity of light. The shifts are generally of the order of less than $\frac{1}{10}$ A.

In order to determine this shift in wave length as a function of time and plasma position, the beam of light from the stellarator is introduced into an Ebert monochromator where the pass-band beam of a narrow range of wave lengths is produced. A doubly refracting crystal plate with optic axes at 45° to the surface and in the horizontal is interposed between the entrance and exit slits in the monochromator. This has the effect of separating the pass band into two polarized halves, or rays having a wavelength separation and also simultaneously conducts these through the exit slit of the monochromator. Advantageously, this plate is made from calcite, which is useful down to 2000 A.

In illustrating this above mentioned separation, reference is made to FIG. 1 which shows two mutually perpendicularly polarized rays in plate 11 comprising an optic ray 13 that passes straight through the plate 11 undeviated, and an extra-ordinary ray 15 that is deviated by an angle $\theta$ with the crystal or plate 11. The total displacement, $x$ of the two rays is given by $x = t \sin$. The law of double refraction for a uniaxial crystal is that $$\frac{\tan r}{\tan r'} = \frac{\mu o}{\mu e}$$

where $r$ and $r'$ are the angles of the two polarized beams as measured from the direction of the axis of the optic ray.

In the case shown $r=45°$ and, therefore, $r'$ is equal to $e/\mu o$. For calcite $\mu e = 1.492$ and $\mu o = 1.670$ at 5000 A. The deviation $t$ is about 3.2°. Thus, the trickness, $t$ of plate 11 required for a $\frac{1}{10}$ A. Separation with a one meter monochromator having a 30,000 groove per inch optical grating as described in more detail hereinafter ($x=25$ microns), is nearly ½ millimeter. With a one-half meter monochromator and a 30,000 groove per inch grating ($x=12.5$ microns), $t$ is about ¼ millimeter.

The calcite thus provides two effective exit slits in a monochromator, separated a distance from each other, or in terms of wavelength by $\delta\lambda$, where $\delta\lambda$ is just the monochromator linear dispersion multipled by $x$.

Should these two rays 13 and 15 be conducted through a prism 17, which separates the rays and conducts them to suitable standard photo-cathodes or photomultipler means 19 and 21 as shown in FIG. 2, the outputs from the photocathodes will correspond linearly with the amount of light received, the wavelength shift $\Delta\lambda$ from $\lambda o$ and the mass plasma motion or velocity. Except for adsorption and refraction losses, all the light energizing from the stellarator is thus utilized in one channel or the other. Moreover, there is no limitation to the time resolution except the response of the photomultipliers, the channel operation can be determined at will by interposing crystals 11 of different $t$, and the advantages of the monochromator have not been compromised in any way.

A practical arrangement for accomplishing the wavelength shift measurement in accordance with this invention is illustrated in FIG. 3. The line spectrum or beam 23 of unpolarized light from the stellarator enters collimator slit 25 of monochromator 26, strikes spherical mirror 27 and is reflected against grating 28, which directs a narrow wavelength portion of beam 23 against mirror 27 for the transmission of a pass-band beam 29 having a narrow range of wavelengths through composite plate 11 for wavelength separation. The entrance and exit slits 25 and 31 of the monochromator 26 are adjustable, providing flexibility for obtaining the best conditions in observing narrow and broad lines. The two channels are geometrically identical, having the same image and aperture stops, thus avoiding the possibility of spatial changes in source light intensity being misinterpreted as wavelength shifts.

Monochromator 26 is a commercial ½ meter Ebert-Fastie monochromator, such as the model 8200 made by the Jarrel Ash Co. Just behind the exit slit 31 is a slide containing quartz and calcite plates 11, 11' and 11" as shown in FIG. 4, arranged so that any one of a number of plates 11 can be interposed in the monochromator between the entrance and exit slits. Advantageously, there are six composite plates 11 with calcite of thickness such that $\delta\lambda$ is 0, 0.1, 0.2, 0.4, 0.7, and 1.0 A. for 500 A. in first order.

The composite plates 11 consist of a rectangular prism 33 of calcite joined to a prism 35 of fused silica inserted so that the optical thickness of the combination is the same for each plate 11. The optical axis of the calcite is orientated, also as shown in FIG. 4, so that the unpolarized pass-band light beam 29 enters the plate 11 and splits into two perpendicular plane-polarized rays or beams 13 and 15, which emerge from plate 11 parallel to the entering beam 29. The extraordinary ray 15 has a deviation angle $\theta$ and the transverse displacement, $\delta x$, is given by $\delta x = \tan \theta$. To avoid possibility that a change in polarization of the source can be confused with a true wavelength shift, a quarter-wave plate (not shown) may be placed just before the composite plate 11 if necessary. This transforms the linearly polarized light into circularly polarized light, and so any change of linear polarization affects both channels 13 and 15 equally. The same result is also obtained by placing a Fresnel rhomb or Babinet-Soliel compensator before the entrance slit of the monochromator 26. Thus the action of the Zeeman effect is eliminated.

After passing through the exit slit 31, a field lens (not shown) focuses the polarized rays 13 and 15 on a prism 17 which makes a separation into two diverging beams 41 and 43 which are focused by a suitable lens (not shown) on the separate photo-cathodes 19 and 21. This prism 17 advantageously is a suitable Wollaston prism, but a Rochon prism or other device to separate the two polarized beams may be substituted therefor.

In operation a spectral line 23 of Gaussian (or near Gaussian) shape and with a half-intensity breadth S enters entrance slit 25 from a stellarator (not shown). The instrumental function of the monochromator 26 is substantially Gaussian with a half-intensity breadth $t$. The line measured is thus a Gaussian function of wavelength with a half-intensity breadth $r$ given by $r = (S^2 + t^2)^{1/2}$.

As shown in FIG. 5 the two neighboring channels A and B, described above as rays or beams are supplied, in effect, by a duochromator $B+A$ with separation $\delta\lambda$. The separation between the two channels $\delta\lambda$ has been chosen so that the two functions A and B cross at the point of their maximum derivative. The wavelength change is proportional to the difference signal $I' = B - A$. Its derivative is the algebraic sum of the derivatives of A and B, and thus is a maximum for the $\delta\lambda$ is given by:

$$dI' = 2\frac{dA}{d\lambda}d_{\max}$$

For this example with Gaussion shapes, $$\delta\lambda = r(2 \ln 2)^{-1/2}$$

or $$\delta\lambda = 0.85r$$

and $$dI' = \frac{4d\lambda}{r}\frac{(2 \ln 2)^{1/2}}{e}$$

or $$d\lambda = 0.35 r dI$$

It is also seen from FIG. 5 that in the neighborhood of $\lambda o$, $B - A$ is practically a straight line, so that in this region $d\lambda/dI'$ is constant.

The sum signal $A+B$ is seen to be essentially constant, and to cancel out effects of intensity fluctuations in the source, the ratio:

$$I = \frac{I'}{A+B} = \frac{A-B}{A+B}$$

may be used, the result being merely to divide the above result for $dI$ by $2/\sqrt{e}$ or about 1.2.

Where the functions involved are not exactly Guassians, the slope of I or I' may be found experimentally by using a constant wavelength $\lambda_o$ and varying $\lambda_A$ and $\lambda_P$ together. This is done simply by changing the setting of the monochromator by a known amount of $d\lambda$, and measuring the resulting $dI$ or $d''$.

Then:

$$\Delta \lambda = \frac{d\lambda}{dI} \cdot \Delta I$$

as before.

From an actual example of the described duochromator, or single field pola-chromator of this invention, FIG. 6 illustrates the strong $3_s'P_1-3_p'D_2$ transistion of singly ionized nitrogen at 3994.996 A., which was used to measure plasma rotation velocity in the Etude stellarator. Hydrogen gas at about 1 micron pressure was used with nitrogen added to provide a strong spectral line. The 3.8 cm. diameter limiter which touched the outside diameter of the plasma was biased at +70 v. with respect to the discharge chamber wall having a diameter of 7.6 cm. Velocities of up to $5 \times 10^{-5}$ cm./sec. are shown as a function of radius. The skew zero line resulted from a zero correction evaluated with $\delta\lambda=0$.

This invention has the advantage of measuring mass motion in a plasma with simple, inexpensive and dependable refraction means and without delicate alignment or complicated electronic gear. Moreover, it provides a spectrographic duochromator or single field pola-chromator for measuring the small Doppler wavelength shifts in hot gasses and plasmas for a wide range of applications, energies, types of particles and particle velocities, temperatures and densities contemplated in stellarators.

What is claimed is:

Apparatus for measuring the wavelength shift in an unpolarized beam of light having a narrow range of wavelengths, comprising monochromator means having a collimator, a grating and an exit slit for supplying and transmitting a narrow wavelength portion of said beam through said exit slit, a first refracting prism in front of said exit slit for splitting said portion into equal perpendicularly polarized rays and transmitting said polarized rays simultaneously through said exit slit, a second refracting prism for separating said polarized rays and transmitting them, and separate photosensitive means for receiving said separated polarized rays for producing an electrical signal corresponding to the amplitude of said separated polarized rays after determining the wavelength shift in said unpolarized beam independently of intensity fluctuations in said unpolarized beam.

References Cited by the Examiner

UNITED STATES PATENTS

| | | | |
|---|---|---|---|
| 2,471,249 | 5/1949 | Stearns et al. | 88—14 |
| 2,998,746 | 9/1961 | Gievers | 88—14 |
| 3,004,465 | 10/1961 | White | 250—226 X |

RALPH G. NILSON, *Primary Examiner.*

J. D. WALL, *Assistant Examiner.*